(12) United States Patent
Knowlen et al.

(10) Patent No.: US 10,132,578 B2
(45) Date of Patent: Nov. 20, 2018

(54) BAFFLED-TUBE RAM ACCELERATOR

(71) Applicant: UNIVERSITY OF WASHINGTON, Seattle, WA (US)

(72) Inventors: Carl Knowlen, Seattle, WA (US); Adam P. Bruckner, Seattle, WA (US); Andrew J. Higgins, Montreal (CA); Viggo Hansen, Mercer Island, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 15/517,942

(22) PCT Filed: Oct. 7, 2015

(86) PCT No.: PCT/US2015/054545
§ 371 (c)(1),
(2) Date: Apr. 7, 2017

(87) PCT Pub. No.: WO2016/057707
PCT Pub. Date: Apr. 14, 2016

(65) Prior Publication Data
US 2017/0307313 A1    Oct. 26, 2017

Related U.S. Application Data

(60) Provisional application No. 62/061,542, filed on Oct. 8, 2014.

(51) Int. Cl.
*F41A 1/02* (2006.01)
*F41F 1/00* (2006.01)
*F41F 3/00* (2006.01)

(52) U.S. Cl.
CPC ............... *F41A 1/02* (2013.01); *F41F 1/00* (2013.01); *F41F 3/00* (2013.01)

(58) Field of Classification Search
CPC ............... F41A 1/02; F41F 1/00; F41F 3/00
(Continued)

(56) References Cited

U.S. PATENT DOCUMENTS 4,722,261 A * 2/1988 Titus ................... F41A 1/04
                                              60/769
4,726,279 A * 2/1988 Kepler ................. F41A 1/04
                                              102/501
(Continued)

FOREIGN PATENT DOCUMENTS

CN    203758025 U    8/2014
DE    3703835 A1    8/1988
(Continued)

OTHER PUBLICATIONS

International Preliminary Report on Patentability dated Apr. 20, 2017, for International Application No. PCT/US2015/054545, filed Oct. 7, 2015, 8 pages.
(Continued)

*Primary Examiner* — Joshua E Freeman
(74) *Attorney, Agent, or Firm* — Christensen O'Connor Johnson Kindness PLLC

(57) ABSTRACT

A baffled ram accelerator system includes a ram accelerator tube with an inner surface and an outer surface and a plurality of baffles disposed on the inner surface. The plurality of baffles forms a sequential series of propellant chambers along the longitudinal axis of the ram accelerator tube. An accelerator gun is also disposed on an input end of the ram accelerator tube, and the accelerator gun is positioned to fire a projectile into the ram accelerator tube.

21 Claims, 7 Drawing Sheets

(58) Field of Classification Search
USPC .............................................................. 89/8
See application file for complete search history.

(56) References Cited

U.S. PATENT DOCUMENTS

| | | | | |
|---|---|---|---|---|
| 4,932,306 A * | 6/1990 | Rom | ..................... | F41A 1/04 102/436 |
| 4,938,112 A * | 7/1990 | Hertzberg | ................. | F41A 1/02 60/768 |
| 4,982,647 A * | 1/1991 | Hertzberg | ................. | F41A 1/04 102/523 |
| 5,063,826 A * | 11/1991 | Bulman | ..................... | F02K 7/10 102/374 |
| 5,097,743 A * | 3/1992 | Hertzberg | ................. | F41A 1/02 60/767 |
| 5,121,670 A * | 6/1992 | Fisher | ..................... | F41A 1/00 89/7 |
| 5,303,632 A * | 4/1994 | Kivity | ..................... | F42B 10/34 102/503 |
| 5,386,759 A | 2/1995 | Onozuka et al. | | |
| 5,394,805 A * | 3/1995 | Giraud | ..................... | F42B 10/06 102/513 |
| 5,421,237 A * | 6/1995 | Naumann | ............... | F41A 21/46 244/63 |
| 5,578,783 A * | 11/1996 | Brandeis | ..................... | F41A 1/00 102/490 |
| 6,089,139 A | 7/2000 | Russell | | |
| 7,237,467 B1 * | 7/2007 | Melton | ..................... | F41A 21/30 89/14.4 |
| 7,775,148 B1 * | 8/2010 | McDermott | ............. | F41A 1/02 124/60 |
| 7,856,914 B2 * | 12/2010 | Shults | ..................... | F41A 21/30 181/223 |
| 8,181,561 B2 | 5/2012 | Riggs et al. | | |
| 9,103,618 B2 * | 8/2015 | Daniel | .................. | F41A 21/325 |
| 2010/0126334 A1 | 5/2010 | Shults et al. | | |
| 2014/0190345 A1 | 7/2014 | Daniel et al. | | |
| 2014/0260930 A1 * | 9/2014 | Russell | ..................... | F41A 1/04 89/7 |
| 2015/0330147 A1 * | 11/2015 | Russell | ..................... | E21B 7/007 89/7 |
| 2016/0123081 A1 * | 5/2016 | Russell | ..................... | E21B 7/16 175/4.57 |
| 2016/0356087 A1 * | 12/2016 | Russell | ..................... | E21B 7/00 |

FOREIGN PATENT DOCUMENTS

| | | |
|---|---|---|
| JP | H04-244597 A | 9/1992 |
| JP | H08-500176 A | 1/1996 |
| RU | 2110754 C1 | 5/1998 |
| RU | 2457418 C1 | 7/2012 |
| RU | 144872 U1 | 9/2014 |
| WO | 2016/057707 A3 | 4/2016 |

OTHER PUBLICATIONS

International Search Report and Written Opinion from the International Searching Authority dated May 16, 2016, for International Application No. PCT/US2015/054545, filed Oct. 7, 2015, 11 pages.
"Gasdynamic Operation of Baffled Tube Ram Accelerator in Highly Energetic Mixtures" (Higgins et al.) [online] <URL https://www.researchgate.neVprofile/Andrew_Higgins3/publication/229051481_Gasdynamic_ Operation_of_Baffled_Tube_Ram_Accelerator_in_Highly_Energetic_Mixtures/links/53eb72c90cf25Oc894797859.pdf>, Jul. 1, 2005.
"Ram Accelerator as an Impulsive Space Launcher: Assessment of Technical Risks" (Knowlen et al.) [online] <URL http://www. tbfg.org/papers/Ram%20Accelerator%20Technical%20Risks%201SDC07.pdf>, May 25, 2007.
First Chinese Office Action and Translation dated Jan. 17, 2018, for Chinese Application No. 201580062939.3, filed Oct. 7, 2015, 17 pages.
Higgins et al., "Gasdynamic Operation of Baffled Tube Ram Accelerator in Highly Energetic Mixtures," 20th International Colloquium on the Dynamics of Explosions and Reactive Systems (McGill University, Jul. 31-Aug. 5, 2005), 5 pages.
Knowlen et al., "Ram Accelerator as an Impulsive Space Launcher: Assessment of Technical Risks," International Space Development Conference, May 25-28, 2007, 21 pages.
European Partial Search Report dated May 17, 2018 for European Application No. 15849327.0, filed Oct. 7, 2015, 14 pages.
Canadian Examination Report dated May 11, 2018 for Canadian Application No. 2,964,109, filed Oct. 7, 2015, 3 pages.
Japanese Office Action and Translation dated May 7, 2018 for Japanese Application No. 2017-518878, filed Oct. 7, 2015, 10 pages.
Bruckner, A.P. et al., "Ram Accelerator," Encyclopedia of Aerospace Engineering, (2010), Blockley, R. & Shyy, W. (eds), John Wiley & Sons, Ltd., Airbreathing Engines 590, 12 pages.
Higgins, A.J. et al., "Gasdynamic Operation of Baffled Tube Ram Accelerator in Highly Energetic Mixtures," (2005), 20th International Colloquium on the Dynamics of Explosions and Reactive Systems, 4 pages.
Higgins, A., "Ram Accelerators: Outstanding Issues and New Directions," (2006), Journal of Propulsion and Power, vol. 22, No. 6, pp. 1170-1187.
Keller, J. "Expendable launch vehicle market to be worth $53 billion through 2020, in production of 693 rockets," Military and Aerospace Electronics, Oct. 25, 2011, http://www.militaryaerospace.com/articles/2011/10/expendable-launch.html, 3 pages.
"Global Space Launch Market Forecast," Spaceref Business, Feb. 6, 2013, http://spaceref.biz/2013/02/global-space-launch-market-forecast.html, 4 pages.
Australian First Examination Report dated Feb. 8, 2018, for Australian Application No. 2015330900, filed Oct. 7, 2015, 5 pages.
Russian Office Action and Translation with Search Report dated Apr. 12, 2018, for Russian Application No. 2017115763, filed Oct. 7, 2015, 9 pages.
Extended European Search Report dated Aug. 23, 2018, for European Application No. 15849327.0, filed Oct. 7, 2015, 10 pages.

* cited by examiner

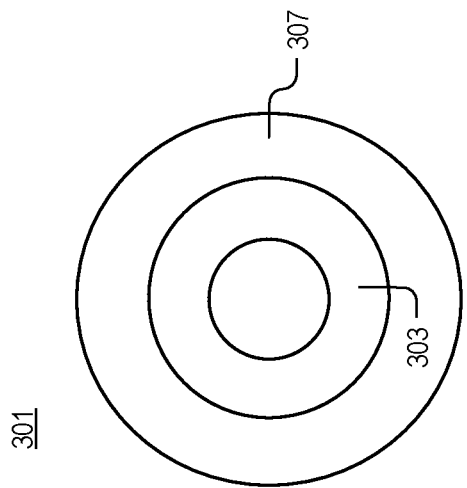
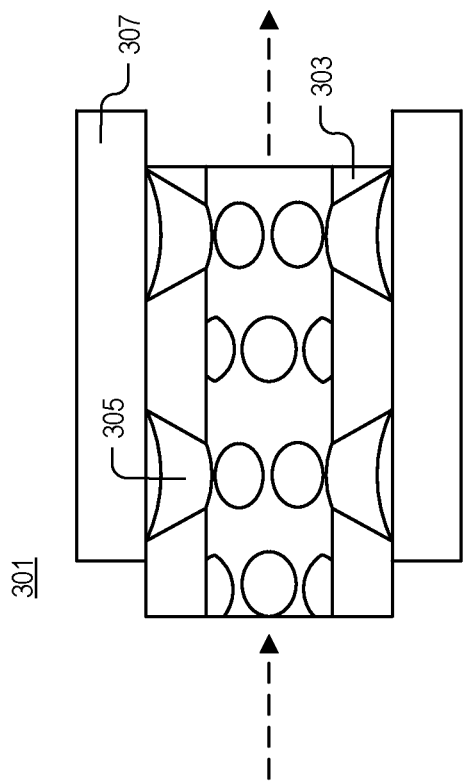
FIG. 3A
FIG. 3B

BAFFLED-TUBE RAM ACCELERATOR

CROSS-REFERENCE TO RELATED APPLICATIONS

This application is the U.S. National Stage entry under 35 U.S.C § 371 of international application PCT/US2015/054545, filed Oct. 7, 2015, which claims the benefit of U.S. Provisional Application No. 62/061,542 filed on Oct. 8, 2014, the contents of which are incorporated herein by reference.

TECHNICAL FIELD

This disclosure relates generally to hypervelocity launchers, and in particular but not exclusively, relates to ram accelerators.

BACKGROUND INFORMATION

A ram accelerator is a device for accelerating projectiles to extremely high speeds using jet-engine-like propulsion cycles based on ramjet and/or scramjet combustion processes. The device operates by propelling a projectile through a stationary tube filled with a combustible gaseous propellant mixture. The ram accelerator shows great potential in applications involving large payloads, such as non-rocket space launch.

In conventional powder guns, propellant is burned behind the projectile in a breech, generating high pressure gas which expands as it pushes the projectile down the barrel. As the projectile moves faster, the propelling gas must expend more energy to accelerate itself to keep up with the projectile. Once the projectile reaches a critical velocity, the propellant gas exerts only enough force to overcome friction, and thereafter the projectile begins to slow down if the barrel is too long.

Conversely, a ram accelerator works by filling a launch tube (barrel) with propellant to accelerate the projectile. With a properly shaped projectile/tube, a unique propulsive cycle can be initiated in which the projectile compresses and ignites the propellant as it travels through the tube. This results in a combustion pulse being accelerated down the tube, where the combustion pulse is self-synchronized with the tailing end of the projectile. In essence, the projectile rides its own combustion wave down the length of the launch tube, allowing the projectile to accelerate to speeds far greater than can be achieved by a conventional powder gun.

BRIEF DESCRIPTION OF THE DRAWINGS

Non-limiting and non-exhaustive examples of the invention are described with reference to the following figures, wherein like reference numerals refer to like parts throughout the various views, unless otherwise specified.

FIGS. 3A-3B show one example of baffled ram accelerator tube construction, in accordance with the teachings of the present invention.

DETAILED DESCRIPTION

Examples of an apparatus and method for a ram accelerator are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in the one or more examples.

Throughout this specification, several terms of art are used. These terms are to take on their ordinary meaning in the art from which they come, unless specifically defined herein or the context of their use would clearly suggest otherwise.

Figure 1A:
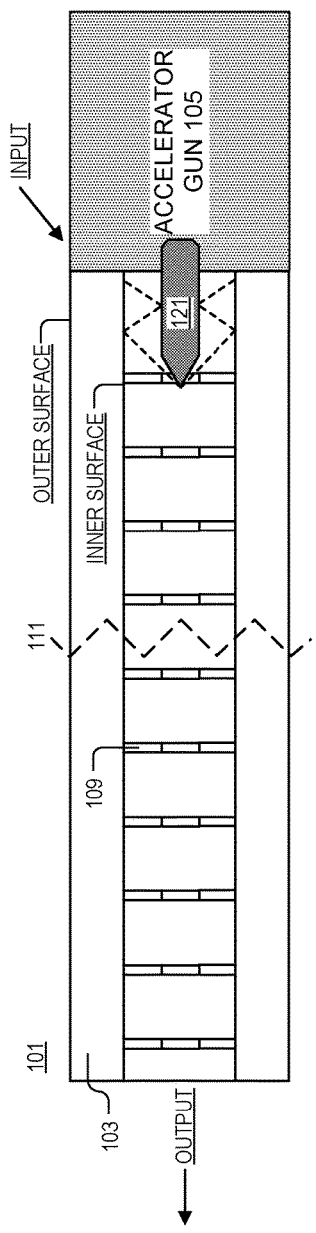
FIGS. 1A-1C show a cross sectional view of one example of a baffled ram accelerator system in various stages of operation, in accordance with the teachings of the present invention.
Figure 1B:
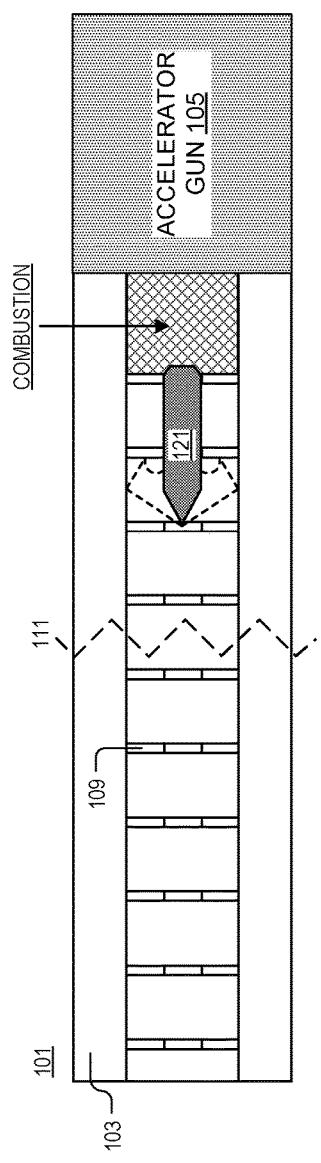
Figure 1C:
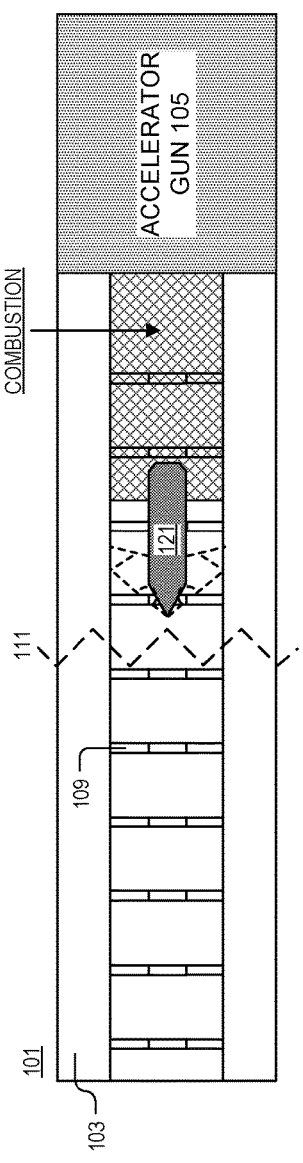

FIGS. 1A-1C show a cross sectional view of one example of a baffled ram accelerator system 101 in various stages of operation. Ram accelerator system 101 includes a ram accelerator tube 103 with an inner surface and an outer surface. A plurality of baffles 109 is located on the inner surface of ram accelerator tube 103, and the plurality of baffles 109 is disposed to form a sequential series of propellant chambers along the longitudinal axis of ram accelerator tube 103. In one example, cuts may be used to form the plurality of baffles 109 by cutting into the inner surface of ram accelerator tube 103. These cuts may form side channels or side bores that extend from the inner surface of ram accelerator tube 103 through the outer surface of ram accelerator tube 103. The cuts may be capped on the outer surface of ram accelerator tube 103 with an additional larger tube or other capping structure. In the depicted example, the plurality of baffles 109 is arranged linearly along the longitudinal axis of the ram accelerator tube 103; however, in other examples not depicted in FIGS. 1A-1C, the plurality of baffles 109 may be arranged into a helix or double-helix that encircles ram accelerator tube 103 (see infra FIG. 2B).

In the depicted example, an accelerator gun 105 is positioned on the input end of ram accelerator tube 103, and accelerator gun 105 is positioned to fire a projectile 121 into ram accelerator tube 103. Accelerator gun 105 may be a light gas gun, explosion powered gun, or otherwise. In one example, a diaphragm may be disposed between accelerator gun 105 and ram accelerator tube 103 to separate accelerator gun 105 from ram accelerator tube 103. The diaphragm may be a thin piece of plastic such as Mylar, or the like.

It should be noted that line break 111 depicts a middle segment of ram accelerator tube 103 omitted from FIGS. 1A-1C. This middle segment may have the same structure or a different structure from the portion of ram accelerator tube 103 visible in FIGS. 1A-1C. In one example, the middle segment of ram accelerator tube 103 contains baffles 109, which may be angled. In another example, the plurality of baffles 109 may extend along only a portion of the inner surface of ram accelerator tube 103 and the middle portion of ram accelerator tube 103 may be smooth-bore. The plurality of baffles 109 may extend from the input end of ram accelerator tube 103, opposite the output end of ram accelerator tube 103, along only a portion of the inner surface of ram accelerator tube 103. Similarly, the plurality of baffles 109 may extend from the output end of ram accelerator tube 103, opposite the input end of ram accelerator tube 103, along only a portion of the inner surface of ram accelerator tube 103.

FIG. 1A depicts ram accelerator tube 103 receiving a projectile 121 from accelerator gun 105 prior to ignition of propellant mixture in ram accelerator tube 103. The flow field schematic is depicted ahead of projectile 121 (dashed line). In operation, ram accelerator tube 103 is pumped full of a gaseous fuel/oxidizer mixture that is ignited behind projectile 121, and projectile 121 rides baffles 109 (and/or internal rails on the inner surface of the ram accelerator tube) as it travels down ram accelerator tube 103. The plurality of baffles 109 (or annular rings) that is inserted or machined into ram accelerator tube 103 isolates the combustion process behind projectile 121. This isolating effect allows more energetic fuel mixtures to be used without the risk of combustion-generated pressure waves being driven upstream of projectile 121. The use of more energetic propellant in conjunction with the greater effective tube area (resulting from the depth of the spaces between plurality of baffles 109), acts to increase the thrust on the projectile without having to increase propellant/fuel fill pressure. Therefore, the plurality of baffles 109 in the ram accelerator tube 103 may be machined to a diameter such that the combustion process in ram accelerator tube 103 is contained behind projectile 121. Furthermore, the length of the projectile 121 may be greater than the distance between two neighboring baffles 109 in ram accelerator tube 103.

FIG. 1B depicts ram accelerator tube 103 post ignition and after projectile 121 has traveled through a series of baffles 109. The flow field schematic is depicted ahead of projectile 121 (dashed line). Here, it can be seen that the plurality of baffles 109 prevents forward moving combustion pulsations from being pushed ahead of projectile 121. Additionally, the baffles 109 act as one-way valves, whereby propellant is ingested by the movement of projectile 121.

FIG. 1C depicts ram accelerator tube 103 post ignition and after projectile 121 has traveled through additional baffles 109. The flow field schematic is depicted ahead of projectile 121 (dashed line). As in FIG. 1B, projectile 121 is ingesting fuel and baffles 109 are acting as one way valves preventing combustion-generated compression waves and other pulsations from being driven ahead of projectile 121.

FIGS. 2A-2D show cross sectional views of examples of baffled ram accelerator tubes 201. In the depicted examples, second hollow cylinder 203 is perforated with uniformly spaced holes 205 along the longitudinal axis of second hollow cylinder 203. Second hollow cylinder 203 is placed within a first hollow cylinder (see infra FIGS. 3A-3B, "first hollow cylinder 307") such that uniformly spaced holes 205 in second hollow cylinder 203 are capped by the inner surface of the first hollow cylinder (e.g., "first hollow cylinder 307"). The resulting hole structures form baffles (e.g., "plurality of baffles 109") in the first hollow cylinder. This tube-within-a-tube method of fabrication may confer advantages over constructing baffles directly on the inner surface of the ram accelerator tube, by cutting down on construction cost and time.

Figure 2A:
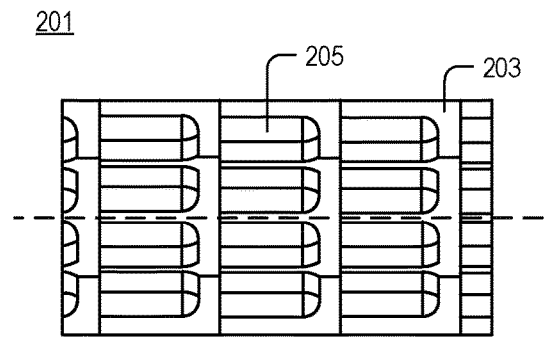
FIGS. 2A-2D show cross sectional views of examples of baffled ram accelerator tubes, in accordance with the teachings of the present invention.

FIG. 2A shows an example of baffled ram accelerator tube 201 where uniformly spaced holes 205 are arranged linearly along the longitudinal axis of the second hollow cylinder 203. Additionally, uniformly spaced holes 205 are noncircular and form an annular pattern around second hollow cylinder 203.

Figure 2B:
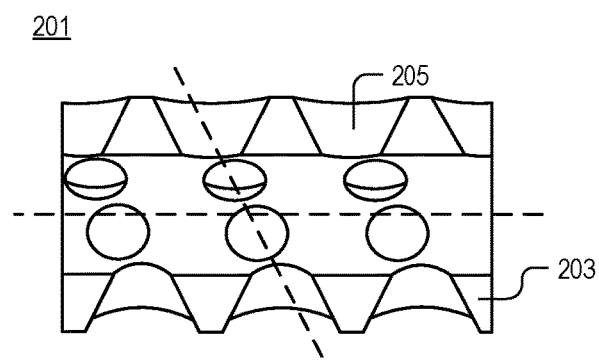

FIG. 2B shows an example of baffled ram accelerator tube 201 where uniformly spaced holes 205 are arranged nonlinearly along the longitudinal axis of second hollow cylinder 203. In the depicted example, uniformly spaced holes 205 are arranged into a helical pattern. However, in another example, the holes may be arranged into a multi-helical pattern such as a double helix.

Figure 2C:
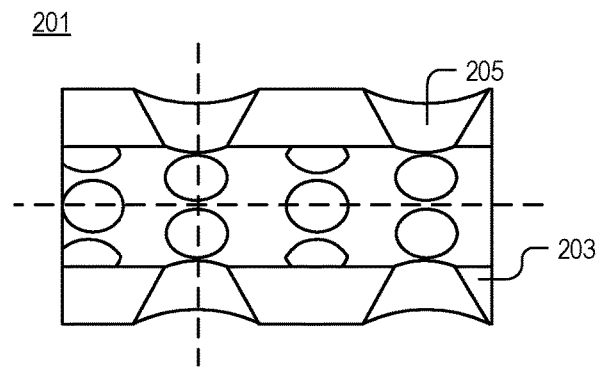

FIG. 2C shows an example of baffled ram accelerator tube 201 where uniformly spaced holes 205 are arranged linearly along the longitudinal axis of the second hollow cylinder 203. In the depicted example, uniformly spaced holes 205 are arranged into an offset (nonlinear) staggered pattern. However, in another example, uniformly spaced holes 205 may be arranged into a non-staggered pattern.

Figure 2E:
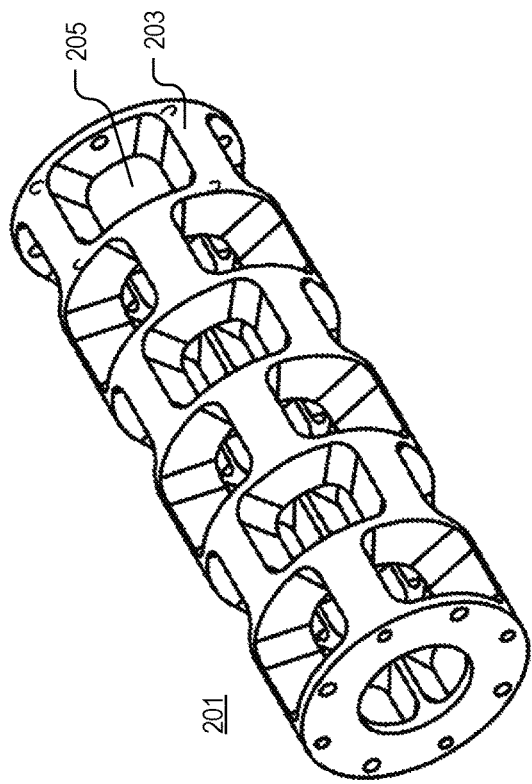
FIG. 2E shows an isometric view of the example baffled ram accelerator tube depicted in FIG. 2D, in accordance with the teachings of the present invention.
Figure 2D:
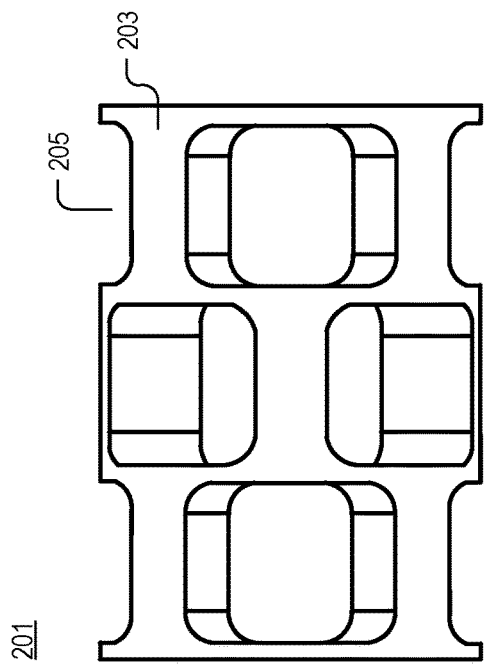

FIG. 2D shows an example of baffled ram accelerator tube 201 where uniformly spaced holes 205 are arranged linearly along the longitudinal axis of the second hollow cylinder 203. In the depicted example, uniformly spaced holes 205 are arranged into an offset staggered pattern and cut into rectangles with beveled edges. Additionally, edges of uniformly spaced holes 205 have a linear taper. However, in another example uniformly spaced holes 205 may have a power-law taper or otherwise.

FIG. 2E shows an isometric view of the example baffled ram accelerator tube 201 depicted in FIG. 2D. In the depicted example, rails formed from the tapered rectangular holes 205 are visible. Additionally, fastener holes are shown for securing multiple baffled ram accelerator tubes 201 together.

Figure 2F:
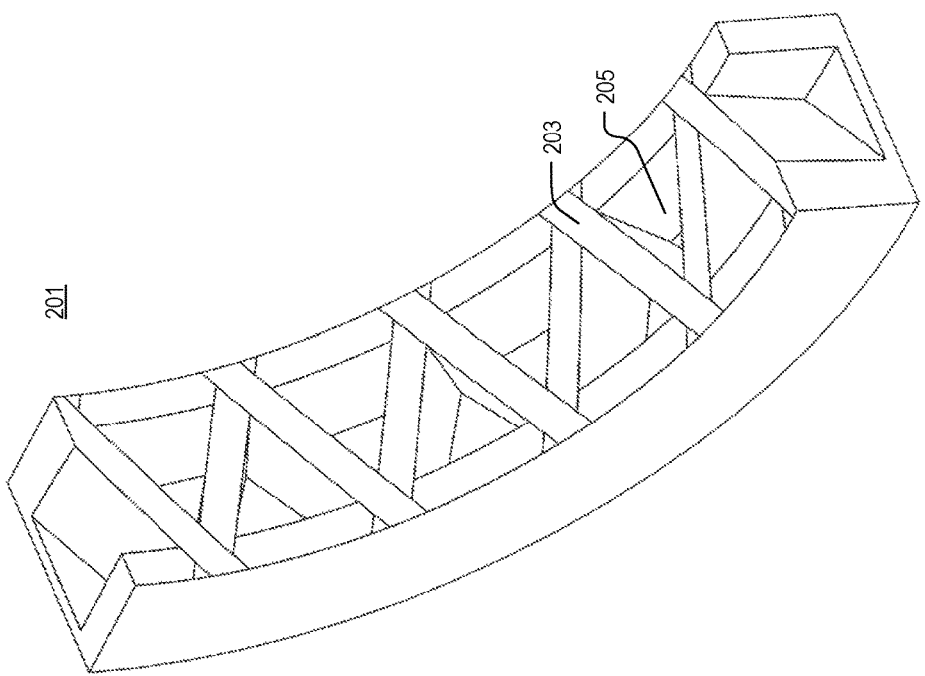
FIG. 2F shows an isometric view of an example baffled ram accelerator tube where uniformly spaced holes are arranged into a triangular pattern, in accordance with the teachings of the present invention.

FIG. 2F shows an isometric view of an example baffled ram accelerator tube 201 where uniformly spaced holes 205 are arranged into a triangular pattern. In the depicted example, these triangular holes form an isogrid baffle pattern (repeating pattern of isosceles triangles). These baffles form rings in baffled ram accelerator tube 201 as well as angled edges (e.g., helical rails) that run along the longitudinal axis of baffled ram accelerator tube 201. In one example, the isogrid rings may be angled in the direction opposite projectile motion. In another example, the isogrid rings may be angled in the direction of projectile motion. In one or more examples, the isogrid pattern (and all other example baffled ram accelerator tubes 201) may be fabricated from carbon fiber, glass phenolic composites, boron fibers, aluminum alloys, high-strength steel, or the like.

FIGS. 3A-3B show one example of baffled ram accelerator tube construction. A second hollow cylinder 303 is placed within a first hollow cylinder 307, such that uniformly spaced holes 305 in second hollow cylinder 303 are capped by the inner surface of the first hollow cylinder 307, and the resulting structures in turn form baffles (e.g., "plurality of baffles 109"). Second hollow cylinder 303 may be secured in first hollow cylinder 307 by press fit/friction fit, weld, adhesive, fastener, or other means. Additionally, multiple second hollow cylinders 303 may be inserted into a single first hollow cylinder 307. In one example, multiple second hollow cylinders 303 of the same design are inserted into a single first hollow cylinder 307. In another example, multiple second hollow cylinders 303 of different design are inserted into a single first hollow cylinder 307. This may include second hollow cylinders 303 with a linear design, helical design, or smooth bore.

First hollow cylinder 307 and second hollow cylinder 303 may be constructed from a wide variety of metals, metal alloys, ceramics, and composite materials. In one example, both first hollow cylinder 307 and second hollow cylinder 303 are constructed from pieces of high-strength steel tubing.

Figure 4A:
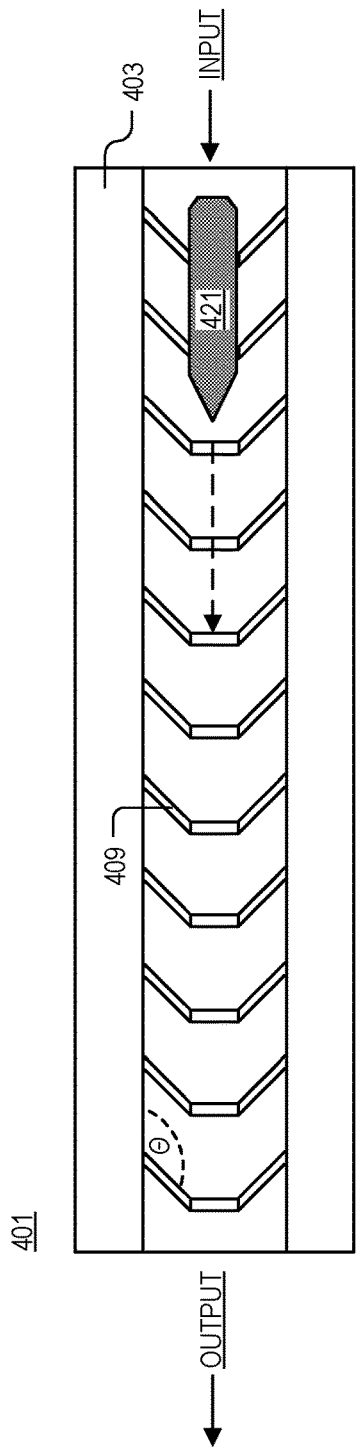
FIGS. 4A-4C show three examples of baffle orientation in a baffled ram accelerator tube, in accordance with the teachings of the present invention.
Figure 4B:
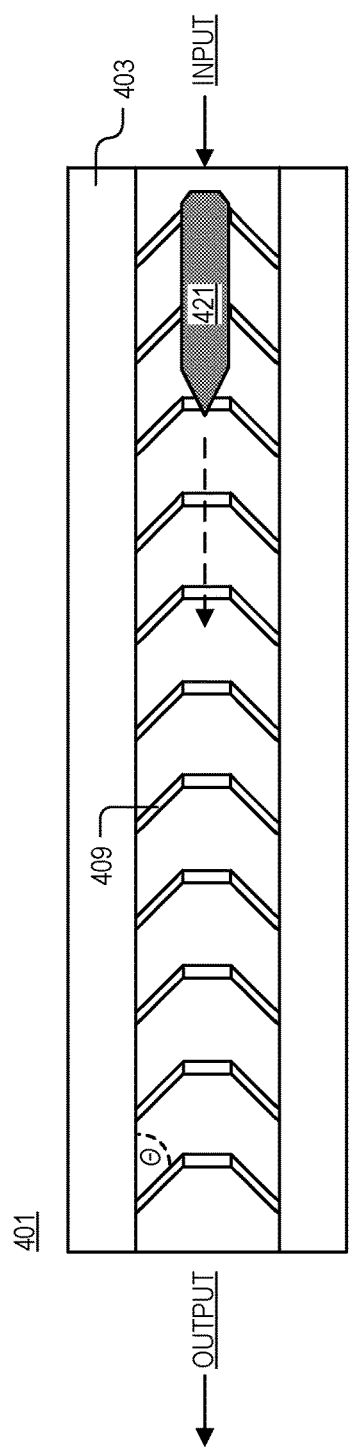
Figure 4C:
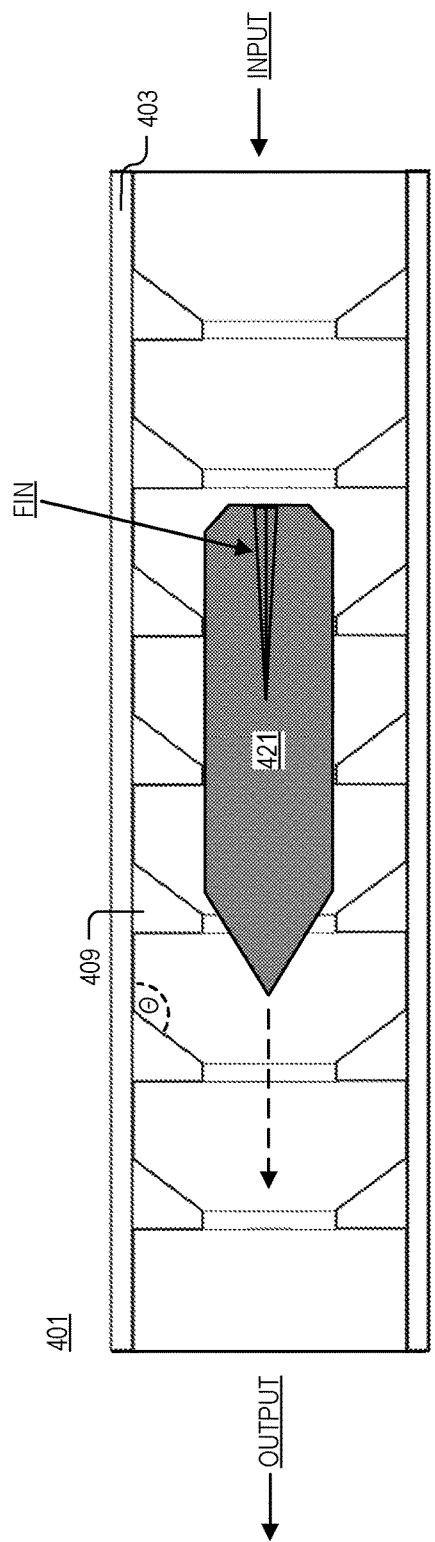

FIGS. 4A-4C show three examples of baffle 409 orientation within a baffled ram accelerator tube 401. In several examples of the present invention, where the plurality of baffles 409 is fabricated by cutting holes in ram accelerator tube 403, uniformly spaced holes may be cut at an angle ($\Theta$) with respect to the surface normal of the inner surface of the second hollow cylinder. In the example depicted in FIG. 4A, the holes are cut at an angle ($\Theta$) toward the output end. However, in the example depicted in FIG. 4B, the holes are cut at an angle ($\Theta$) toward the input end. Alternatively, the plurality of baffles 409 may be fabricated directly on the inner surface of ram accelerator tube 403 and may be angled toward the input end or the output end of ram accelerator tube 403.

In operation, slanting of baffles 409 in the direction of projectile 421 may increase the operational Mach number in a given propellant by diffracting projectile driven shock waves. This attenuates the strength of the shock wave in front of projectile 421 and prevents detonation of the propellant in front of projectile 421. Alternatively, slanting the baffles 409 opposite the direction of projectile motion offers advantages in igniting the propellant in the chamber around the shoulder of projectile 421 at a lower Mach number. Accordingly, the internal baffle angle and configuration of the ram accelerator tube can be tuned depending on use case, desired projectile speed, projectile dimensions, tube length limitations, etc. In one example, angled baffles 409 may be used in the whole length of the ram accelerator tube 403. In another example, angled baffles 409 may be used in part of the length of ram accelerator tube 403. In either of the previous two examples, the baffles 409 in ram accelerator tube 403 may all have the same angle or may have angles of varying degree and direction in order to optimize the speed and acceleration of projectile 421, depending on use case. Additionally, portions or all of the ram accelerator tube 403 may not have any baffles 409 and may be smooth bore.

FIG. 4C shows one example of a saw-tooth baffle 409 configuration. In the depicted example, one face of baffles 409 is angled in the direction of projectile motion, and baffle 409 diameter decreases approaching the center of ram accelerator tube 401. In an example not depicted, one face of baffles 409 is angled in the direction opposite projectile motion. In another example, both faces of baffles 409 may be angled.

It is worth noting that in some examples; tube/baffle configurations may be fabricated using additive manufacturing processes, including 3D printing or the like. For example, fused deposition modeling, fused filament fabrication, robocasting, electron beam melting, laminated object manufacturing, selective laser sintering, direct metal laser sintering, selective laser melting, or the like are all viable additive manufacturing candidates. 3D printing and other additive manufacturing processes may ease the production of highly intricate/asymmetric baffled-tube configurations.

In several examples, a finned projectile may be employed. The plurality of baffles may be machined to accommodate a wide variety of fin configurations. In some examples, annular baffles provide a surface for the fins of the projectile to ride along when traveling through the baffled tube. Similarly, finned projectiles that span at least the distance between two baffles may be employed to help stabilize the finned projectile. The use of fins may, in some examples, allow for the ram combustion process to begin at speeds 30%-50% lower than in a smooth-bore tube using the same finned projectile. In one example, the fins on the projectile may be disposed symmetrically around the perimeter of the projectile; however, in other examples the fins may be disposed asymmetrically. In one example, an odd number of fins may be disposed on the projectile; in another example an even number of fins may be disposed on the projectile. In some examples, the ram accelerator tube may have a tailored inner diameter and tailored baffles to facilitate use of finned projectiles. Projectile and fin geometry can take any number of shapes and orientations depending on use case.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A ram accelerator system, the system comprising:
a ram accelerator tube with an inner surface and an outer surface;
a plurality of baffles including uniformly spaced holes disposed on the inner surface of the ram accelerator tube, wherein the plurality of baffles is disposed to form a sequential series of propellant chambers along the longitudinal axis of the ram accelerator tube, and wherein edges of the uniformly spaced holes have a linear taper; and
an accelerator gun disposed on an input end of the ram accelerator tube, wherein the accelerator gun is positioned to fire a projectile into the ram accelerator tube.

2. The ram accelerator system of claim 1, wherein the plurality of baffles is arranged linearly along the longitudinal axis of the ram accelerator tube.

3. The ram accelerator system of claim 1, wherein the plurality of baffles is arranged into a helix along the longitudinal axis of the ram accelerator tube.

4. The ram accelerator system of claim 1, wherein the ram accelerator tube has an output end opposite the input end, and wherein the plurality of baffles is angled toward the output end.

5. The ram accelerator system of claim 1, wherein the ram accelerator tube has an output end opposite the input end, and wherein the plurality of baffles is angled toward the input end.

6. The ram accelerator system of claim 1, further comprising a projectile, wherein the length of the projectile is greater than the distance between two neighboring baffles in the ram accelerator tube.

7. The ram accelerator system of claim 6, wherein the plurality of baffles in the ram accelerator tube is machined to a diameter such that a combustion process in the ram accelerator tube is contained behind the projectile.

8. The ram accelerator system of claim 1, wherein the plurality of baffles extends along only a portion of the inner surface of the ram accelerator tube.

9. The ram accelerator system of claim 8, wherein the plurality of baffles extends from the input end of the ram accelerator tube, opposite an output end of the ram accelerator tube, along only a portion of the inner surface of the ram accelerator tube.

10. The ram accelerator system of claim 8, wherein the plurality of baffles extends from an output end of the ram accelerator tube, opposite the input end of the ram accelerator tube, along only a portion of the inner surface of the ram accelerator tube.

11. The ram accelerator system of claim 1, further comprising rails to guide a projectile, wherein the rails are disposed on the inner surface of the ram accelerator tube between adjacent baffles in the plurality of baffles.

12. The ram accelerator system of claim 11, wherein the projectile includes fins disposed along a periphery of the projectile.

13. The ram accelerator system of claim 1, wherein the plurality of baffles is cut into the inner surface of the ram accelerator tube.

14. The ram accelerator system of claim 13, wherein the cuts used to form the plurality of baffles extend from the inner surface of the ram accelerator tube through the outer surface of the ram accelerator tube, and wherein the cuts are capped on the outer surface the ram accelerator tube.

15. A baffled ram accelerator tube, the baffled ram accelerator tube comprising:

a first hollow cylinder; and
a second hollow cylinder, wherein the second hollow cylinder is perforated with uniformly spaced holes along the longitudinal axis of the second hollow cylinder, and wherein the second hollow cylinder is disposed within the first hollow cylinder such that the uniformly spaced holes in the second hollow cylinder are capped by the inner surface of the first hollow cylinder to form the baffles, wherein edges of the uniformly spaced holes have a linear taper.

16. The ram accelerator tube of claim 15, wherein the uniformly spaced holes are angled with respect to surface normal of the inner surface of the second hollow cylinder.

17. The ram accelerator tube of claim 15, wherein the uniformly spaced holes are arranged linearly along the longitudinal axis of the second hollow cylinder.

18. The ram accelerator tube of claim 15, wherein the uniformly spaced holes are arranged into a helix along the longitudinal axis of the second hollow cylinder.

19. The ram accelerator tube of claim 15, wherein the uniformly spaced holes are noncircular.

20. The ram accelerator tube of claim 15, wherein the uniformly spaced holes are triangular.

21. A baffled ram accelerator tube, the baffled ram accelerator tube comprising:

a first hollow cylinder; and
a second hollow cylinder, wherein the second hollow cylinder is perforated with uniformly spaced holes along the longitudinal axis of the second hollow cylinder, and wherein the second hollow cylinder is disposed within the first hollow cylinder such that the uniformly spaced holes in the second hollow cylinder are capped by the inner surface of the first hollow cylinder to form the baffles, wherein baffle diameter decreases in the direction of a center of the second hollow cylinder such that the baffles form a saw-tooth structure.

* * * * *